United States Patent [19]  [11] 3,927,122
Bourdin et al. [45] Dec. 16, 1975

[54] PROCESS FOR THE PREPARATION OF ALKYLPHENOLS

[75] Inventors: Francois Bourdin, Lyon; Francois Chizat, Bron; Michel Costantini, Lyon; Michel Jouffret, Francheville Le Bas, all of France

[73] Assignee: Rhone-Poulenc S.A., Paris, France

[22] Filed: Dec. 20, 1971

[21] Appl. No.: 210,207

[30] Foreign Application Priority Data
Dec. 22, 1970 France .............................. 70.46219

[52] U.S. Cl.......... 260/621 G; 260/494; 260/624 R; 260/626 R; 260/626 T
[51] Int. Cl.²...................... C07C 27/00; C07C 37/00; C07C 67/44
[58] Field of Search............ 260/621 R, 621 G, 494, 260/626 R, 626 T, 624 R

[56] References Cited
UNITED STATES PATENTS
3,376,351  4/1968  Amedjian et al. .......... 260/621 G X OTHER PUBLICATIONS
Ogata et al., "Jour. Chem. Soc.", Vol. 26, pp. 4803–4807, (1961).

*Primary Examiner*—Norman Morgenstern
*Attorney, Agent, or Firm*—Stevens, Davis, Miller & Mosher

[57] ABSTRACT

Phenols nuclear substituted by 1 to 3 straight chain or branched chain alkyl substituents of 1 to 10 carbons are prepared by oxidising the aldehyde group of the corresponding alkyl substituted benzaldehyde with an organic peracid, which is derived from a carboxylic acid of pKa in water of at least 4, in the presence of a carboxylic acid of pKa in water less than 4. The formate ester of the phenol, which may be in the reaction product, is hydrolysed or transesterified to form the phenol.

13 Claims, No Drawings

PROCESS FOR THE PREPARATION OF ALKYLPHENOLS

The present invention relates to a process for the preparation of alkylphenols, particularly cresols, by oxidation of alkylbenzaldehydes by means of a peracid.

The cresols are particularly important industrial products used in the manufacture of resins, plasticisers, anti-oxidants and agricultural chemicals. Most of the cresols used in industry are extracted from the alkaline wash liquors of petroleum distillates or coal tars. They are generally obtained in the form of mixtures with phenol and xylenols. The extraction processes are generally complicated and only permit the individual cresols to be separated after numerous distillation stages and treatment of the extracts. In addition to these extraction processes, various methods of synthesis of the cresols have been proposed. Thus it is possible to hydrolyse diazonium salts of toluidines, to carry out an alkaline fusion of toluenesulphonic acids, to alkylate phenol and to decompose isopropyltoluene hypoperoxides with acid. None of these methods is entirely satisfactory however because of the reaction conditions (for example use of high temperatures or of corrosive media) or as a result of the use of uncommon starting materials.

A known process for obtaining phenols consists in oxidising an aromatic aldehyde with a peracid such as peracetic acid or perbenzoic acid, in accordance with the BAYER and WILLIGER reaction. It has been found that, if the aromatic nucleus of the aldehyde contains an electron donor group (such as hydroxyl or alkoxy group), the reaction generally leads to the almost quantitative formation of the phenol corresponding to the aldehyde (possibly in the form of its formate). On the other hand, if the aromatic nucleus carries an electron acceptor group (a nitro or methylcarbonyloxy group or a halogen atom) the reaction leads to the formation of the corresponding benzoic acid. Thus J. BOESEKEN et al. [Rec. Trav. Chim. Pays-Bas, 55, 815 (1936)] oxidised piperonal (3,4-methylenedioxybenzaldehyde) with peracetic acid in the presence of sulphuric acid as a catalyst to give 3,4-methylenedioxyphenol; various dialkoxybenzaldehydes such as 3,4-dimethoxybenzaldehyde, 3-methoxy-4-ethoxybenzaldehyde and 3,4-diethoxybenzaldehyde have been oxidised to the corresponding phenols by means of a peracetic acid in acetic acid in the presence of p-toluenesulphonic acid at between 30° and 35°C. [J. BOESEKEN et al., ibid. 58, 528 (1939)]; A. WACEK et al. [Ber. 73, 644 (1940), ibid. 74, 845 (1941)] oxidised various aldehydes by means of hydrogen peroxide/acetic acid combinations or by means of previously formed peracetic acid in acetic acid, where appropriate in the presence of p-toluenesulphonic acid, at a temperature of between 30° and 70°C: under these conditions salicylaldehyde, 2-hydroxy-4-methylbenzaldehyde and 2-methoxy-benzaldehyde are converted into the formate of the corresponding phenol. On the other hand, the o- and m-nitro-benzaldehydes are oxidised to benzoic acids. Oxidation of p-hydroxybenzaldehyde by perbenzoic acid in benzene at ordinary temperatures produces hydroquinone in excellent yield (78%) [Y. OGATA et al. [J. Org. Chem. 26, 4803 (1961)]. In alcohol, in an acid medium, p-hydroxybenzaldehyde, salicyaldehyde and p-methoxy-benzaldehyde give the corresponding phenols in excellent yields (Y. OGATA, ibid, 34, 3985 (1969)]. Though the rule stated above is confirmed in the majority of cases in the investigations indicated, some exceptions are found: J. D'ANS et al. [Ber. 48, 1136 (1915)] report that 4-methoxy-benzaldehyde is quantitatively oxidised to p-methoxybenzoic acid by peracetic acid in aqueous alcohol; Y. OGATA et al. [J. Org. Chem. 26, 4803 (1961)] also show that 4-methoxybenzaldehyde is principally oxidised to the corresponding acid by perbenzoic acid in benzene; under the same conditions, p-methylbenzaldehyde yields p-toluic acid in a yield of 74% and p-cresol in a yield of only 26%, even though the methyl group, and in more general terms the alkyl groups, are considered to be electron donor groups. It has furthermore been found that the substitution of peracetic acid for perbenzoic acid also leads to the formation of p-toluic acid from p-methylbenzaldehyde if the reaction is carried out in a solvent such as acetic acid, benzene, ethers or alcohols. It is thus found that peracetic and perbenzoic acids, which are derived from carboxylic acids of pKa in water of greater than 4, do not permit p-methylbenzaldehyde to be oxidised to p-cresol if they are used in a neutral solvent such as benzene or in an acid as weak as that from which they are derived.

From an industrial point of view it would be particularly valuable to be able to convert methylbenzaldehydes into the corresponding cresols, because the starting products are easily obtained by oxidation of xylenes.

The present invention provides a process for the preparation of an alkylphenol of general formula:

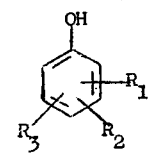

I in which each of the symbols $R_1$, $R_2$ and $R_3$, which may be the same or different represents a hydrogen atom or a straight-chain or branchedchain alkyl radical containing 1 to 10 carbon atoms with the proviso that not more than 2 of the symbols $R_1$, $R_2$ and $R_3$ represent hydrogen atoms by oxidation of an alkylbenzaldehyde of the general formula:

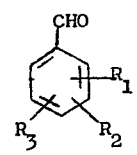

II wherein the symbols $R_1$, $R_2$ and $R_3$ are as hereinbefore defined by means of an organic peracid, which is derived from a carboxylic acid of pKa in water of at least 4, in the presence of a carboxylic acid of pKa in water less than 4, and, if necessary, converting any formate ester of the phenol of formula I into the phenol of formula I.

In the formulae (I) and (II), each of the symbols $R_1$, $R_2$ and $R_3$ which may be the same or different preferably represents a hydrogen atom, a methyl, ethyl, propyl, isopropyl, butyl, isobutyl, t-butyl, pentyl or nonyl radical with the proviso that not more than two of symbols $R_1$, $R_2$ and $R_3$ represent hydrogen atoms.

Examples of the peracids are those derived from acetic, benzoic, phenylacetic, propionic, butyric, isobutyric, 4-phenyl-butyric, n-caproic, heptanoic, cyclohexanoic, hexanoic, octanoic and nonanoic acids. Other acids having a pKa in water of at least 4 are given in the "Handbook of Chemistry and Physics" 45th edition (1964–1965), pages D-77-D-78. Peracetic acid, perbenzoic acid, perpropionic acid, perbutyric acid and phenylperacetic acid are preferably used as the peracid.

These peracids may be obtained by known processes which have been described in detail by D. SWERN, [Chem. Rev. 45, page 1 (1949)], in Org. Reactions 7, 378 (1953) or in the encyclopaedia Houben-Weyl "Methoden de Organischen Chemie", Volume 8, pages 1 to 74. Depending on the particular case (in general depending on their stability), the peracids can be employed either in the preformed state or by forming them in situ in the reaction mixture. A particularly advantageous means of forming the peracid in situ consists of oxidising the corresponding acid with hydrogen peroxide, optionally in the presence in the reaction mixture of an acid catalyst (e.g. sulphuric acid, a sulphonic acid, such as p-toluenesulphonic acid, or perchloric acid). The acid catalyst does not interfere with the course of the aldehyde oxidation reaction.

Taking into account the respective solubilities of the aldehyde and the peracid, it is possible to use the acid of pKa less than 4 as a solvent if it is liquid under the reaction conditions e.g. the reaction temperature, or to employ, where appropriate a neutral solvent such as aliphatic hydrocarbons (e.g. hexane), cycloaliphatic hydrocarbons (e.g. cyclohexane) or aromatic hydrocarbons (e.g. benzene, xylene, toluene or ethylbenzene) or halogenated aliphatic, cycloaliphatic or aromatic hydrocarbons (e.g. chloroform, methylene chloride, 1,2-dichloroethane, chlorobenzene, chlorotoluene or benzyl chloride). Examples of the carboxylic acids of pKa less than 4 are formic, bromoacetic, chloroacetic, dichloroacetic, trichloroacetic, trifluoroacetic and o-nitrobenzoic acids.

The molar ratio of the acid of pKa less than 4 to the peracid varies according to the particular compounds used, but in general, a molar ratio of at least 0.01:1 and preferably at least 0.1:1 is used. There is no upper critical limit. Molar ratios of 0.13:1 to 2.2:1 have been found to be very satisfactory. If the peracid employed is accompanied by an excess of the acid from which it is derived, the ratio defined above is the ratio of the molar amount of acid of pKa less than 4 to the molar amount of acid of pKa of at least 4 present both in the free state and in the form of the peracid.

Examples of aldehydes of formula (II) are o-tolualdehyde, p-tolualdehyde, p-isopropylbenzaldehyde, 3-isopropylbenzaldehyde, p-tertiary butylbenzaldehyde, p-2-butylbenzaldehyde, p-pentylbenzaldehyde, 2,3-dimethylbenzaldehyde, 2,4-dimethylbenzaldehyde, 2-methyl-4-isopropylbenzaldehyde, 2-methyl-4-t-butyl-benzaldehyde, 2,3,4-trimethylbenzaldehyde, 2,4,5-trimethylbenzaldehyde and 2,4-dimethyl-6-t-butylbenzaldehyde.

The temperature at which the reaction can be carried out varies within wide limits depending on the peracid and the aldehyde. Generally, temperatures of between $-20°$ and $+120°C$. are employed, and the reaction is preferably carried out at between $0°$ and $80°C$.

The molar ratio of peracid/aldehyde is preferably between 0.1:1 and 1.5:1 but it is generally not necessary to exceed a molar ratio of 1.1:1.

The phenol formed during the reaction is mainly present as the formate, though, depending on the conditions, a part of the latter may be hydrolysed to free phenol and formic acid by the water which may be present in the reaction mixture. The phenol is liberated from the formate by hydrolysis, preferably acid or base catalysed or by trans-esterification with a volatile alcohol (e.g. methanol or ethanol), preferably acid catalysed.

It is especially advantageous to use formic acid as the solvent in the process of the invention, because at the end of the reaction it can be recycled, together with the acid resulting from the oxidation, to be used again as solvent.

The present process is very suitable for continuous operation.

The following examples illustrate the invention.

EXAMPLE 1

60 cm³ of anhydrous formic acid and 5 g. of 96% by weight p-tolualdehyde are introduced into a 500 cm³ flask equipped with a reflux condenser, a dropping funnel, a stirring device, a thermometer and a nitrogen inlet.

The contents of the flask are brought to 10°C. whilst stirring and 44 g. of a 10% by weight solution of peracetic acid in acetic acid [obtained by adding 70% strength by weight hydrogen peroxide (14.6 g., 0.3 mol) to 180 g. of glacial acetic acid containing sulphuric acid (1 mol per 100 mols of $H_2O_2$)] are then introduced from the dropping funnel over 10 minutes. These conditions are maintained, whilst stirring, until the active oxygen, as determined iodometrically on a sample of the reaction mixture, has disappeared. 100 cm³ of methanol and 50 mg. of p-toluenesulphonic acid are added and the mixture is then heated to the boiling point of the methanol.

The p-cresol and the unconverted p-tolualdehyde are determined in the reaction mixture by gas-liquid chromatography. The p-toluic acid present is converted into its methyl ester by reaction with diazomethane, and the ester is then determined by gas-liquid chromatography.

The results of the reaction are as follows:
degree of conversion of the aldehyde : 73.5%
yield of cresol relative to aldehyde converted: 71%
yield of p-toluic acid relative to aldehyde converted : 17.5%

The gas-liquid chromatographic determination of the p-cresol and the p-tolualdehyde is carried out on a CARBOWAX phase on Embacel (registered trademarks). The oven temperature is 170°C. O-cresol is used as the internal standard for determining the p-cresol. Nitrobenzene serves as an internal standard for the determination of the p-tolualdehyde.

EXAMPLE 2

The procedure of Example 1 is followed, replacing the formic acid with trifluoroacetic acid (pKa=0.70) and, for comparison, acetic acid (pKa = 4.75). The results listed in the table below were obtained:

| Acid solvent | Yields relative to aldehyde converted | |
|---|---|---|
| | p-cresol | p-toluic acid |
| Trifluoroacetic acid | 82% | 0% |
| Acetic acid | 24% | 69% |

EXAMPLE 3

The procedure of Example 1 is followed, replacing the peracetic acid with perbenzoic acid (the temperature is 25°C). Under these conditions, 81% of p-cresol relative to aldehyde converted are obtained.

EXAMPLE 4

5 g. of 96% by weight p-tolualdehyde ($4 \times 10^{-2}$ mol), 20 cm³ of benzene, 3 cm³ of anhydrous formic acid ($8 \times 10^{-2}$ mol) and 10 cm³ of a solution of perbenzoic acid in benzene ($4 \times 10^{-2}$ mol) are introduced into a 100 cm³ glass flask equipped with stirrer system and a cooling system. The formic acid/perbenzoic acid ratio is 2:1.

The contents of the flask are kept at ambient temperature for 6 hours. A homogeneous solution is obtained, which contains $2 \times 10^{-3}$ mol of active oxygen. The formic acid and benzene are distilled under a pressure of 20 mm of mercury and 70 cm³ of methanol and 50 mg. of p-toluenesulphonic acid are then added. The mixture is heated to the boiling point of the methanol. 19.3 g. of a methanolic solution are obtained, and the p-cresol and p-tolualdehyde therein are determined by gas-liquid chromatography. The results of the reaction are as follows:

degree of conversion of p-tolualdhyde: 93%
yield of p-cresol
    relative to aldehyde converted: 73.5%
    relative to perbenzoic acid: 68%

EXAMPLE 5

The procedure of Example 4 is followed, but the amounts of formic acid and perbenzoic acid employed are respectively $5 \times 10^{-3}$ mol and $3.7 \times 10^{-2}$ mol, representing a formic acid/perbenzoic acid ratio of 0.13:1.
The results of the reaction are as follows:
degree of conversion of aldehyde: 90%
yield of p-cresol
    relative to aldehyde converted: 46%
    relative to oxidising agent: 44%.

If, following Y. OGATA and others [J. Org. Chem. 26, 4803, (1961)], the formic acid is omitted, the yield of p-cresol is only 26%.

We claim:

1. In a process for the preparation of an alkylphenol of general formula

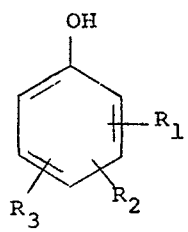

wherein $R_1$ to $R_3$ are selected from the group consisting of hydrogen and straight-chain or branched chain alkyl of 1 to 10 carbons with the proviso that not more than two of the symbols $R_1$, $R_2$ and $R_3$ represent hydrogen, by oxidizing an alkyl benzaldehyde of general formula

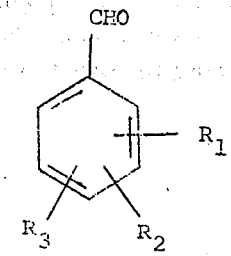

wherein $R_1$ to $R_3$ are as defined above, by means of an organic peracid, the improvement which comprises using an organic percarboxylic acid, the parent carboxylic acid of which has a $pK_a$ in water of at least 4, in the presence of a carboxylic acid of $pK_a$ in water less than 4 whereby an oxidation product is obtained containing more alkylphenol than alkylbenzoic acid.

2. Process according to claim 1, wherein the oxidation is performed in a reaction medium comprising the carboxylic acid of pKa less than 4 which is liquid at the reaction temperature.

3. Process according to claim 1, wherein the oxidation is performed in a reaction medium comprising a solvent selected from the group consisting of aliphatic, cycloaliphatic and aromatic hydrocarbon and their halogenated derivatives.

4. Process according to claim 1, wherein the peracid is selected from the group consisting of peracetic, perpropionic and perbenzoic acids.

5. Process according to claim 1, wherein the carboxylic acid of pKa less than 4 is selected from the group consisting of formic acid, monochloroacetic acid, dichloroacetic acid, trichloroacetic acid and trifluoroacetic acid.

6. Process according to claim 1, wherein the molar ratio of the carboxylic acid to the peracid is at least 0.01:1.

7. Process according to claim 1, wherein the reaction temperature is between −20° and 120°C. and the molar ratio of peracid/aldehyde is between 0.1:1 and 1.5:1.

8. Process according to claim 1, wherein the peracid is prepared in situ by reaction of hydrogen peroxide with the carboxylic acid of pKa in water of at least 4.

9. Process according to claim 1, wherein each of symbols $R_1$, $R_2$ and $R_3$ which may be the same or different represents a hydrogen atom, a methyl, ethyl, propyl, isopropyl, butyl, isobutyl, t-butyl, pentyl or nonyl radical with the proviso that not more than two of symbols $R_1$, $R_2$ and $R_3$ represent hydrogen atoms.

10. Process according to claim 9, wherein the aldehyde oxidised is o-tolualdehyde, p-tolualdehyde, p-isopropylbenzaldehyde, 3-isopropylbenzaldehyde, p-tertiary butylbenzaldehyde, p-2-butylbenzaldehyde, p-pentylbenzaldehyde, 2,3-dimethylbenzaldehyde, 2,4-dimethylbenzaldehyde, 2-methyl-4-isopropylbenzaldehyde, 2-methyl-4-t-butylbenzaldehyde, 2,3,4-trimethylbenzaldehyde, 2,4,5-trimethylbenzaldehyde and 2,4-dimethyl-6-t-butylbenzaldehyde.

11. Process for the preparation of p-cresol according to claim 1, p-tolualdehyde is oxidised by means of peracetic acid or perbenzoic acid in formic acid or trifluoroacetic acid at a temperature of between −20° and 120°C, the molar ratio of peracid/p-tolualdehyde being between 0.1 and 1.5.

12. Process according to claim 11, wherein the molar ratio of carboxylic acid to peracid is 0.13:1 to 2.2:1, the molar ratio of peracid to p-tolualdehyde is 0.92:1 to 1.5:1 and the reaction temperature is 10° to 25°C.

13. Process according to claim 1, wherein the formate ester of the phenol of formula I is present in the oxidation product and is hydrolysed or transesterified to the phenol.

* * * * *